United States Patent
Yadav et al.

(10) Patent No.: US 11,645,170 B2
(45) Date of Patent: May 9, 2023

(54) METHOD AND SYSTEM FOR GENERATING BACKUPS OF VIRTUAL MACHINES BY GROUPING

(71) Applicant: EMC IP Holding Company LLC, Hopkinton, MA (US)

(72) Inventors: Sunil Yadav, Bangalore (IN); Manish Sharma, Bangalore (IN); Aaditya Rakesh Bansal, Bagalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/238,690

(22) Filed: Apr. 23, 2021

(65) Prior Publication Data

US 2022/0342781 A1    Oct. 27, 2022

(51) Int. Cl.
*G06F 11/14*    (2006.01)

(52) U.S. Cl.
CPC ...... *G06F 11/1484* (2013.01); *G06F 11/1435* (2013.01); *G06F 11/1461* (2013.01); *G06F 11/1464* (2013.01); *G06F 11/1469* (2013.01)

(58) Field of Classification Search
CPC ............. G06F 11/1484; G06F 11/1435; G06F 11/1461; G06F 11/1464; G06F 11/1469

USPC ........................................................ 714/4.11
See application file for complete search history.

(56) References Cited

U.S. PATENT DOCUMENTS

| | | | | |
|---|---|---|---|---|
| 2012/0324073 A1* | 12/2012 | Dow | ..................... | G06F 9/5088 |
| | | | | 709/223 |
| 2019/0324865 A1* | 10/2019 | Weissman | ........... | G06F 11/1461 |

OTHER PUBLICATIONS

Wikipedia "backup" page, from date Oct. 20, 2022, retrieved from https://en.wikipedia.org/wiki/Backup (Year: 2022).*

* cited by examiner

*Primary Examiner* — Yair Leibovich
(74) *Attorney, Agent, or Firm* — Chamberlain, Hrdlicka, White, Williams & Aughtry (57) ABSTRACT

Techniques described herein relate to a method for generating backups of virtual machines. The method may include, in response to identifying a backup generation event associated with virtual machines: obtaining, by a backup agent, virtual machine metadata associated with the virtual machines; identifying groups of virtual machines based on the virtual machine metadata; provisioning resources to generate backups of the virtual machines based on the groups of virtual machines; and generating a backup of the virtual machines based on the groups of virtual machines using the provisioned resources associated with the groups of virtual machines.

20 Claims, 8 Drawing Sheets

METHOD AND SYSTEM FOR GENERATING BACKUPS OF VIRTUAL MACHINES BY GROUPING

BACKGROUND

Computing devices may provide services. To provide the services, the computing devices may include hardware components and software components. Data may be generated by the computing devices during the performance of the services. The data may be important to users. To protect the data, backups of the data may be generated and stored in storage devices. Generating backups of different portions of data may require different computational resources and/or computation times.

SUMMARY

In general, certain embodiments described herein relate to a method for generating backups of virtual machines. The method may include, in response to identifying a backup generation event associated with virtual machines: obtaining, by a backup agent, virtual machine metadata associated with the virtual machines; identifying groups of virtual machines based on the virtual machine metadata; provisioning resources to generate backups of the virtual machines based on the groups of virtual machines; and generating a backup of the virtual machines based on the groups of virtual machines using the provisioned resources associated with the groups of virtual machines.

In general, certain embodiments described herein relate to a system for generating backups of assets. The system may include a backup storage that includes persistent storage for storing virtual machine metadata and a backup agent that includes a processor and memory, and configured to, in response to identifying a backup generation event associated with virtual machines: obtain, by a backup agent, virtual machine metadata associated with the virtual machines; identify groups of virtual machines based on the virtual machine metadata; provision resources to generate backups of the virtual machines based on the groups of virtual machines; and generate a backup of the virtual machines based on the groups of virtual machines using the provisioned resources associated with the groups of virtual machines.

In general, certain embodiments described herein relate to a non-transitory computer readable medium that includes computer readable program code, which when executed by a computer processor enables the computer processor to perform a method for generating backups of virtual machines. The method may include, in response to identifying a backup generation event associated with virtual machines: obtaining, by a backup agent, virtual machine metadata associated with the virtual machines; identifying groups of virtual machines based on the virtual machine metadata; provisioning resources to generate backups of the virtual machines based on the groups of virtual machines; and generating a backup of the virtual machines based on the groups of virtual machines using the provisioned resources associated with the groups of virtual machines.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general embodiments of the invention relate to systems and methods for generating backups of virtual machines by grouping. The virtual machines may be grouped based on virtual machine size, change information associated with the virtual machines, virtual machine resources associated with the virtual machines, and/or workload information associated with the virtual machines. Resources of the production host are provisioned to perform the backup generation of each of the groups of virtual machines to minimize the impact of performing the data protection services on the virtual machine workloads. Further, each virtual machine group is backed up independently using the provisioned resources. As a result, virtual machines with similar backup generation times are backed up together to increase the efficiency of backing up large quantities of virtual machines associated with varying virtual machine metadata, and therefore, require varying backup generation times.

Figure 1A:
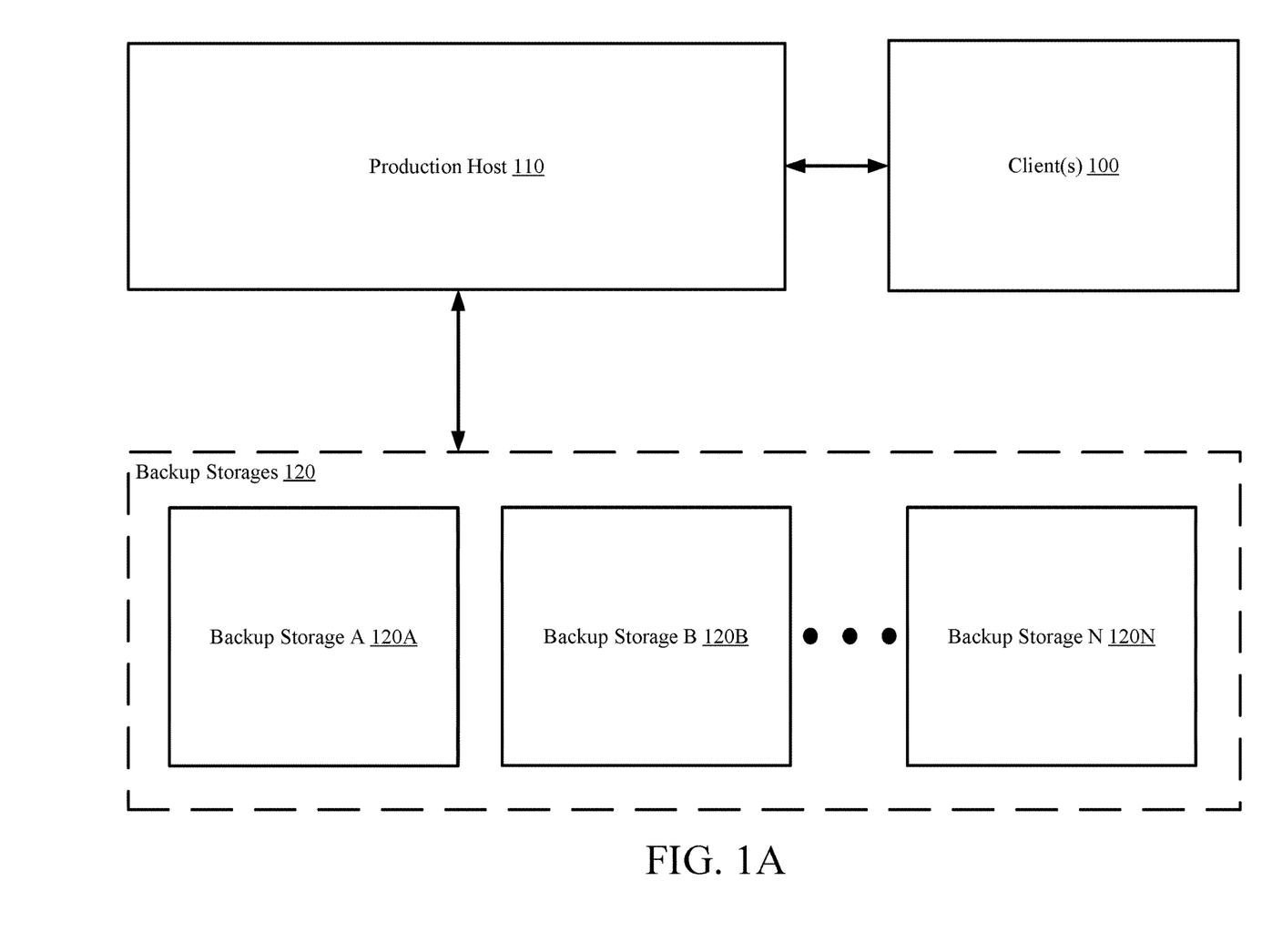
FIG. 1A shows a diagram of a system in accordance with one or more embodiments of the invention.

FIG. 1A shows a diagram of a system in accordance with one or more embodiments of the invention. The system may include client(s) (100), a production host (110), and backup storages (120). The system may include additional, fewer, and/or different components without departing from the invention. Each component may be operably connected to any of the other components via any combination of wired and/or wireless connections. Each of the aforementioned components is discussed below.

In one or more embodiments of the invention, the client(s) (100) utilize computer implemented services provided by the production host (110). Specifically, the client(s) (100) may utilize virtual machines (discussed below) hosted by the production host to obtain, modify, and/or store data. The data may be generated from virtual machines hosted in the production host (110).

Figure 5:
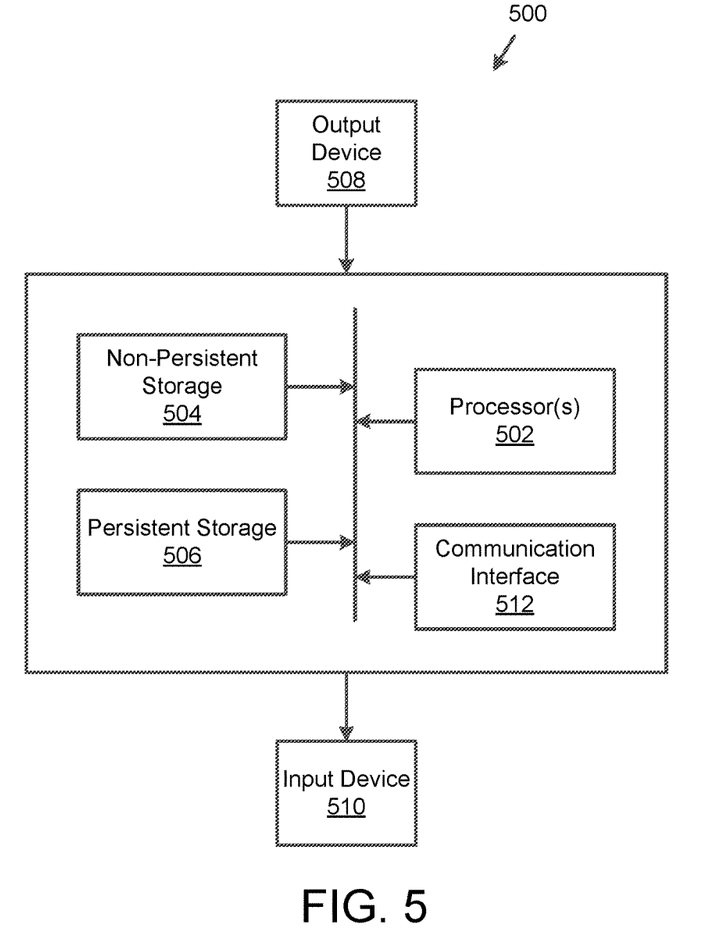
FIG. 5 shows a diagram of a computing device in accordance with one or more embodiments of the invention.

In one or more embodiments of the invention, a client(s) (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client(s) (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the production host (110) provides computer implemented services to the client(s) (100). The computer implemented services may include database services, instant messaging services, electronic communication services, data processing services and any other type of computer implemented services without departing from the invention. The production host (110) may obtain backup storage services from the backup storages (120). The backup storage services may include storing backups of data generated by the client(s) and/or the production host (110) during the performance of the aforementioned computer implemented services. The backup storage services may further include providing backups to the production host (110) for restoration of lost and/or corrupt data and/or other and/or additional purposes without departing from the invention. The production host (110) may obtain and/or provide other and/or additional services without departing from the invention. For additional information regarding the production host (110), refer to FIG. 1B.

In one or more embodiments of the invention, the production host (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110) described throughout this application. For additional information regarding the production host (110), refer to FIG. 1B.

In one or more embodiments of the invention, the production host (110) is implemented as a logical device. The logical device may utilize the computing resources of any number of computing devices and thereby provide the functionality of the production host (110) described throughout this application. For additional information regarding the production host (110), refer to FIG. 1B.

In one or more embodiments of the invention, the backup storages (120) include the functionality to provide backup storage services to the production host as discussed above. The backup storage services may include (i) obtaining backups of virtual machine data generated through the performance of computer implemented services, (ii) storing the virtual machine backup data and backup metadata associated with the backups in persistent storage of the backup storages (120), and (iii) providing backup data and/or backup metadata to the production host (110) for restoration purposes and/or other and/or additional purposes without departing from the invention. The backup storage services may include other and/or additional services without departing from the invention. The backup storages (120) may include any number of backup storages without departing from the invention. The backup storages (120) may include backup storage A (120A), backup storage B (120B), and backup storage N (120N). For additional information regarding the backup storages (120) refer to FIG. 1C.

In one or more embodiments of the invention, the backup storages (120) are implemented as a computing devices (see e.g., FIG. 5). A computing device of the computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup storage (e.g., backup storage A (120A)) of the backup storages (120) described throughout this application.

In one or more embodiments of the invention, the backup storages (120) are implemented as logical devices. The logical devices may utilize the computing resources of any number of computing devices and thereby provide the functionality of the backup storages (120) described throughout this application.

Figure 1B:
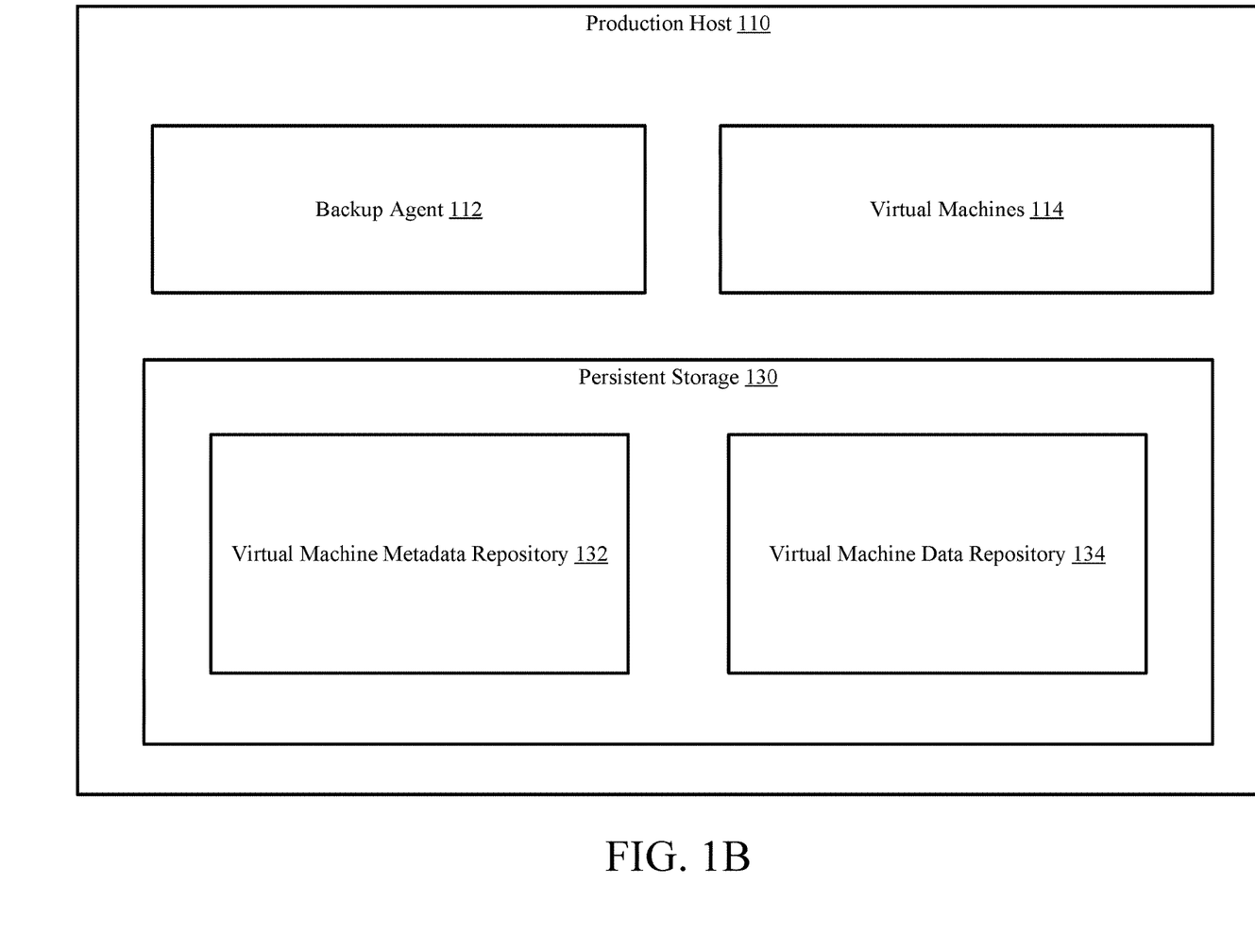
FIG. 1B shows a diagram of a production host in accordance with one or more embodiments of the invention.

FIG. 1B shows a diagram of a production host in accordance with one or more embodiments of the invention. The production host (110) may be an embodiment of the production host (110, FIG. 1A) discussed above. As discussed above, the production host may provide computer implemented services to the client(s) (100) and obtain backup storage services from the backup storages (120). To provide and obtain the aforementioned computer implemented services and the backup storage services, the production host may include a backup agent (112), virtual machines (114), and persistent storage (130). The production host may include other and/or additional components without departing from the invention. Each of the aforementioned components is discussed below.

In one or more embodiments of the invention, the backup agent (112) includes the functionality to perform data protection services for the virtual machines (114). The data protection services may include (i) maintaining a virtual machine metadata repository (132) (discussed below) associated with the virtual machines (114), (ii) identifying groups of virtual machines based on virtual machine metadata associated with the virtual machines (114), (iii) provision resources of to generate the backups of the groups of virtual machines, and (iv) initiate the generation of the backups of the virtual machines using the provisioned resources. The backups may include virtual machine data of virtual machines (114) included in a virtual machine data repository (134) (discussed below). The backup agent (112) may provide the backups to the backup storages (120), where the backups may be stored in persistent storage of the backup storages (120). In one or more embodiments of the invention, the backup agent (112) may further include functionality for tracking changes to virtual machines (114) and to generate and/or obtain change information associated with the virtual machines (114). The backup agent (112) may perform data protection services via the methods illustrated in FIGS. 3A-3B. The backup agent may include other and/or additional functionality without departing from the invention.

In one or more embodiments of the invention, the backup agent (112) may perform data protection services based on backup policies implemented by the backup agent (112). The backup policies may specify a schedule in which the virtual machines (e.g., 114) are to be backed up. The backup agent (112) may be triggered to generate a backup of virtual machines and to provide the backup to the backup storages (120) in response to a backup policy. Alternatively, data protection services may be performed by the backup agent (112) in response to a backup request triggered by the client(s) (100). The backup request may specify the virtual machines (114) to be backed up.

In one or more embodiments of the invention, the backup agent (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (112) described throughout this application.

In one or more embodiments of the invention, the backup agent (112) is implemented as computer instructions, e.g., computer code, stored on a persistent storage that when executed by a processor of the production host (110) causes the production host (110) to provide the functionality of the backup agent (112) described throughout this application.

In one or more embodiments of the invention, the production host (110) hosts virtual machines (114). The virtual machines (114) may be logical entities executed using computing resources (not shown) of the production host (110). Each of the virtual machines (114) may be performing similar or different processes. In one or more embodiments of the invention, the virtual machines (114) provide services to users, e.g., clients (100, FIG. 1A). For example, the virtual machines (114) may host components. The components may be, for example, instances of databases, email servers, and/or other applications. The virtual machines (114) may host other types of components without departing from the invention.

In one or more of embodiments of the invention, the virtual machines (114) are implemented as computer instructions, e.g., computer code, stored on a persistent storage (e.g., 130) that when executed by a processor(s) of the production host (110), cause the production host (110) to provide the functionality of the virtual machines (114) described throughout this application.

In one or more embodiments of the invention, the persistent storage (130) stores data. The persistent storage (130) may include a virtual machine metadata repository (132) and a virtual machine data repository (134). The virtual machine metadata repository (132) and the virtual machine data repository (134) may be stored in and/or across persistent storage of remote storage devices of entities not shown in the system of FIG. 1A without departing from the invention. The persistent storage (130) may store other and/or additional data without departing from the invention. Each of the aforementioned types of data stored in the persistent storage (130) is discussed below.

The virtual machine metadata repository (132) may be one or more data structures that include information regarding the virtual machines (114) hosted by the production host (110). The information included in the virtual machine metadata repository (132) may be used by the backup agent (112) to identify virtual machine groups and to generate backups of the groups of virtual machines during the performance of data protection services. The virtual machine metadata repository (132) may include other and/or additional information without departing from the invention. For additional information regarding the virtual machine metadata repository (132), refer to FIG. 2.

The virtual machine data repository (134) may include one or more data structures that may be used to generate backups of groups of virtual machines (114). The virtual machine data repository (134) may include data generated by users of the virtual machines (114) as discussed above. The data may be any type of data such as database data and email data generated by users of the virtual machines (114) without departing from the invention. Each virtual machine of the virtual machines (114) may include any quantity of data without departing from the invention. Users (e.g., clients (100, FIG. 1A)) may use the data of the virtual machine data repository (134) when obtaining computer implemented services from the production host (110). Additionally, the data of the virtual machine data repository (134) may be obtained by the backup agent (112) to generate backups. The data of the virtual machine data repository (134) may be used by other and/or additional entities for other and/or additional purposes without departing from the invention.

The persistent storage (130) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (130) may utilize portions of any combination of hard disk drives, solid state disk drives, tape drives, and/or any other physical storage medium of any number of computing devices.

Figure 1C:
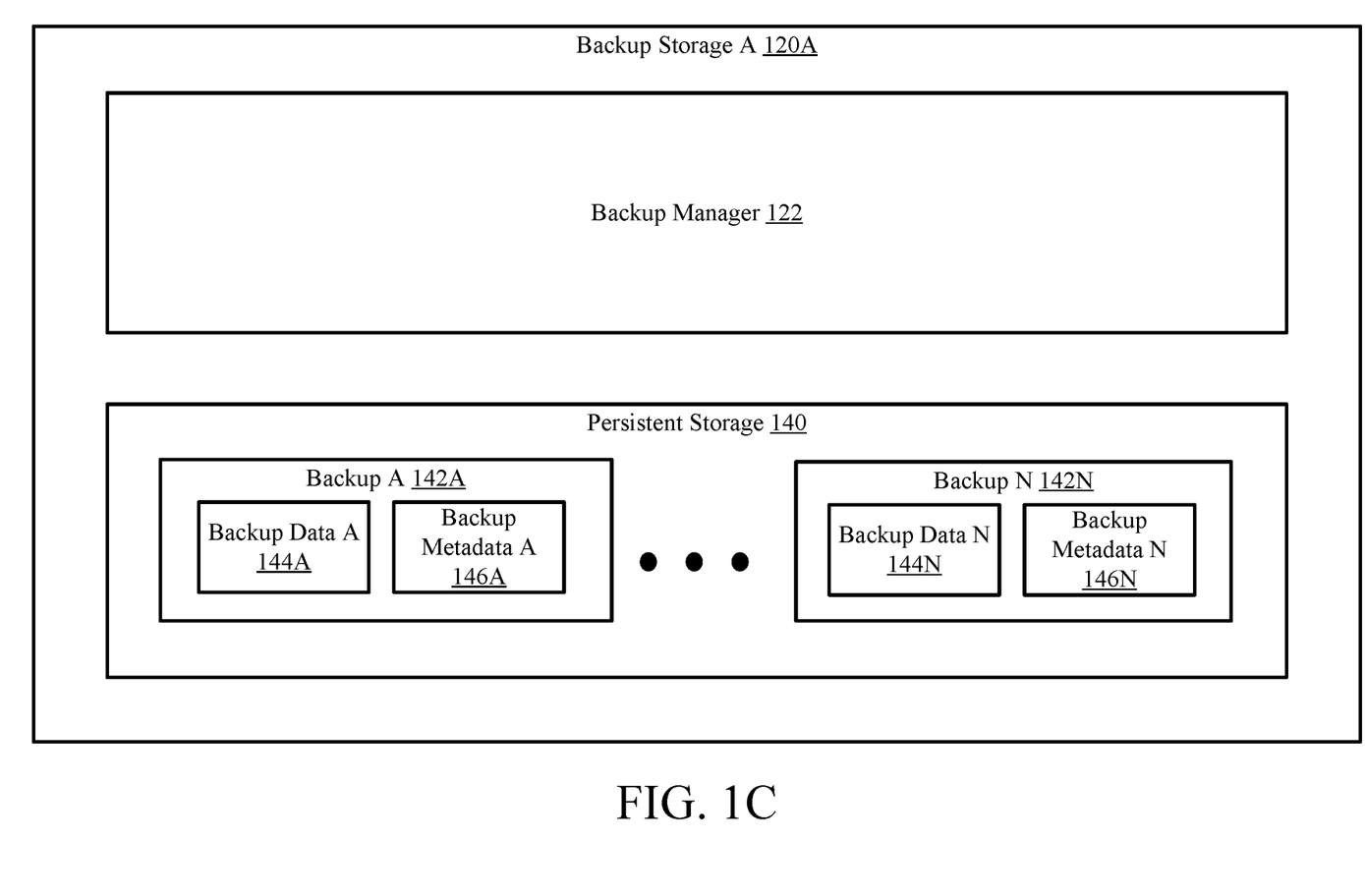
FIG. 1C shows a diagram of a backup storage in accordance with one or more embodiments of the invention.

FIG. 1C shows a diagram of a backup storage in accordance with one or more embodiments of the invention. Backup storage A (120A) may be an embodiment of a backup storage of the backup storages (e.g., 120, FIG. 1A) discussed above. As discussed above, backup storage A (120A) may provide backup storage services to the production host (110, FIG. 1A). To provide the aforementioned backup storage services, backup storage A (120A) may include a backup manager (122) and persistent storage (140). Backup storage A (120A) may include other and/or additional components without departing from the invention. Each of the aforementioned components is discussed below.

In one or more embodiments of the invention, the backup manager (122) includes functionality to obtain backups (e.g., 142A, 142N) of virtual machines from the production host (110, FIG. 1A), and store the backups (e.g., 142A, 142N) in persistent storage (140). The backup manager (122) may also include the functionality to provide backups (e.g., 142A, 142N) to the production host (110, FIG. 1A) for restoration purposes and/or other and/or additional purposes without departing from the invention. The backup manager (122) may include other and/or additional functionalities without departing from the invention.

In one or more embodiments of the invention, the backup manager (122) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (122) described throughout this application.

In one or more embodiments of the invention, the backup manager (122) is implemented as computer instructions, e.g., computer code, stored on a persistent storage (140) that when executed by a processor of backup storage A (120A) causes backup storage A (120A) to provide the functionality of the backup manager (122) described throughout this application.

In one or more embodiments of the invention, the persistent storage (140) stores data. The data stored in persistent storage (140) may backups (e.g., 142A, 142N) of data associated with virtual machines (e.g., 114, FIG. 1B) hosted by the production host (110, FIG. 1B). The persistent storage (140) may include any quantity of backups without departing from the invention. The persistent storage (140) may include backup A (142A) and backup N (142N). The persistent storage (140) may store and include other and/or additional data without departing from the invention.

The backups, e.g., backup A (142A) and backup N (142N), may be one or more data structures that include backup data (e.g., backup data A (144A) and backup data N (142N)) and backup metadata (e.g., backup metadata A (146A) and backup metadata N (146N)). The backup data (e.g., 144A, 144N) may include copies of virtual machine data obtained from the virtual machine data repository (134, FIG. 1B) and used by the backup agent (112, FIG. 1B) to generate the backups (e.g., 142A, 142N). The backup data (e.g., 144A, 144N) may include copies of data associated with any quantity of virtual machines without departing from the invention. The backups may be generated as part of a groups of virtual machines, where the backups of the groups of virtual machines may be performed in parallel and, therefore, backup data (e.g., 144A, 144N) may be stored in the persistent storage (140) at different times and in different locations (i.e., different portions of different storage devices of the persistent storage (140)). The backup metadata (e.g., 146A, 146N) may include information associated the corresponding backup data (e.g., 144A, 144N). The information may include backup identifiers, virtual machine identifiers, virtual machine structures, virtual machine sizes, and storage locations associated with the corresponding virtual machine data (e.g., 144A, 144N) of the virtual machines included in the backups (e.g., 142A, 142N). The backups (e.g., 142A, 142N) may be used to restore virtual machines on the production host (110, FIG. 1A). The backups (e.g., 142A, 142N) may include other and/or additional data and/or information and may be used for other and/or additional purposes without departing from the invention.

The persistent storage (140) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (140) may utilize portions of any combination of hard disk drives, solid state disk drives, tape drives, and/or any other physical storage medium of any number of computing devices.

Figure 2:
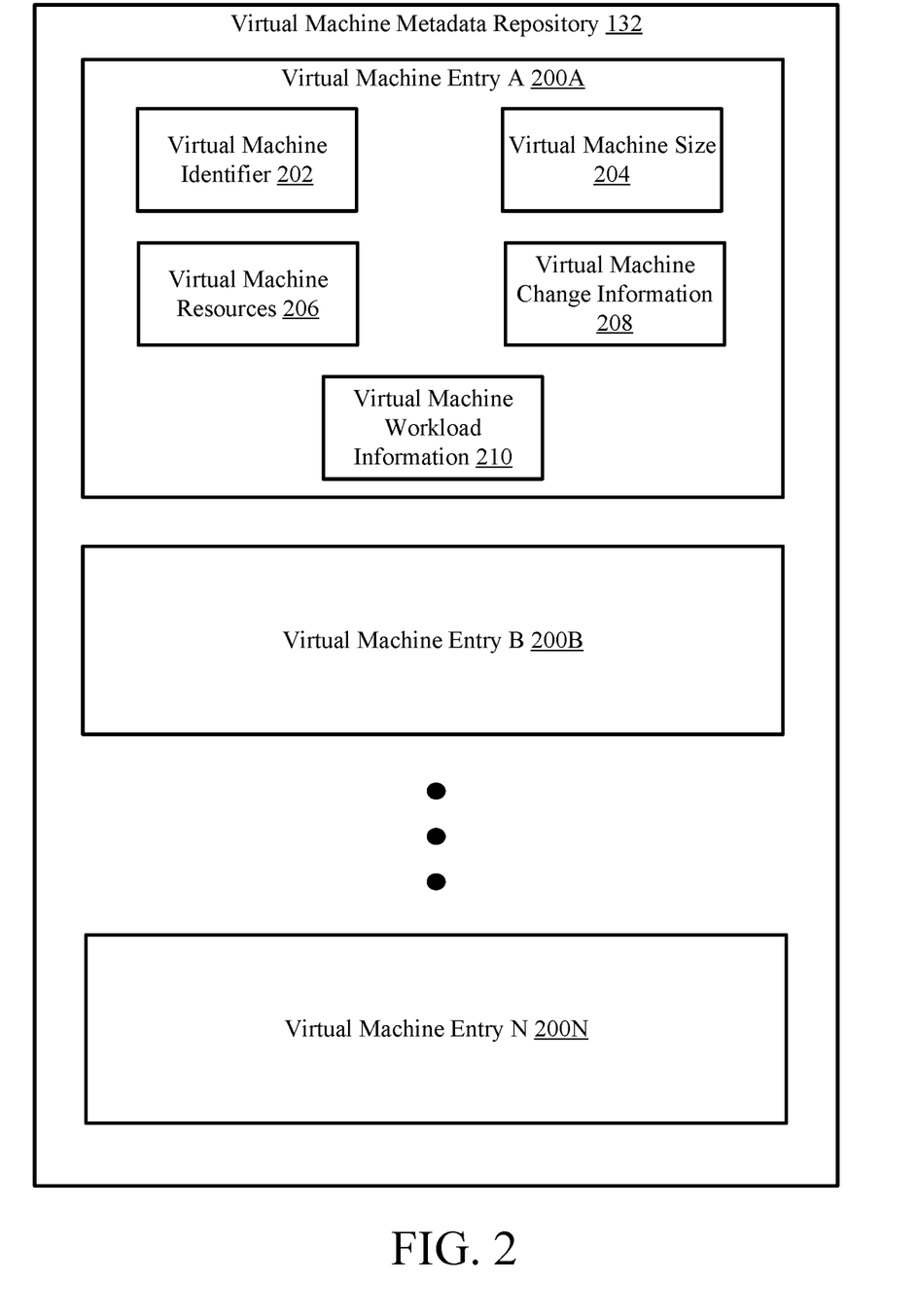
FIG. 2 shows a diagram of a virtual machine metadata repository in accordance with one or more embodiments of the invention.

FIG. 2 shows a diagram of a virtual machine metadata repository in accordance with one or more embodiments of the invention. The virtual machine metadata repository may be an embodiment of the virtual machine metadata repository (132, FIG. 1B) discussed above. As discussed above, the virtual machine metadata repository (132) may include information associated with virtual machines hosted by the production host (110, FIG. 1A) and may be used by the backup agent (112, FIG. 1B) to generate backups (e.g., 142A, 142N, FIG. 1C) during the performance of data protection services. The virtual machine metadata repository (132) may be maintained and updated by the backup agent (112, FIG. 1B). The information included the virtual machine metadata repository may be generated by virtual machines (114, FIG. 1B), an entity(ies) not illustrated in the figures that tracks the virtual machines (114, FIG. 1B), and/or users of client(s) (100, FIG. 1A) during the performance of computer implemented services. The information included in the virtual machine metadata repository (132) may be obtained by the backup agent (112, FIG. 1B) and included in the virtual machine metadata repository (132) periodically and/or during the performance of data protection services. The virtual machine metadata repository (132) may include any quantity of virtual machine entries, where each virtual machine entry is associated with a virtual machine hosted by the production host (e.g., 110, FIG. 1A). The virtual machine metadata repository (132) may include virtual machine entry A (200A), virtual machine entry B (200B), and virtual machine entry N (200N).

In one or more embodiments of the invention, virtual machine entry A (200A) includes a virtual machine identifier (202), a virtual machine size (204), virtual machine resources (206), virtual machine change information (208), and a virtual machine workload information (210). A virtual machine identifier (202) may be a unique global bit string associated with the virtual machine that is associated with virtual machine entry A (200A). A virtual machine identifier (202) may be used by components of the system illustrated in FIG. 1A to specify the virtual machine associated with virtual machine entry A (200A) from other virtual machines. The virtual machine size (204) may specify the overall size of the virtual machine and/or sizes of the elements included in the virtual machine. The virtual machine size (204) may include any representation of quantity of data (e.g., megabytes, kilobytes, etc.) without departing from the invention.

The virtual machine resources (206) may specify resources associated with the virtual machine that is associated with the virtual machine entry (200A). The resources may include a hypervisor (not shown) that manages the virtual machine, one or more processors that may execute the virtual machine, storage devices that may include the virtual machine data associated with the virtual machine, and/or any other resources associated with the virtual machine without departing from the invention. The virtual machine resources (206) may include other and/or additional information associated with the resources associated with the virtual machine without departing from the invention. The virtual machine change information (208) may specify portions of the virtual machine data that have change since the generation of the previous backup associated with the virtual machine, including the quantity of virtual machine data that has changed.

The virtual machine change information (208) may include information regarding the generation of previous backups associated with the virtual machine that specify the time it took to backup the virtual machine and the quantity of changed virtual machine data included in the backup of the virtual machine. The virtual machine change information (208) may include other and/or additional information regarding changes to the virtual machine since the generation of previous backups associated with the virtual machine without departing from the invention. The virtual machine load information (210) may include information regarding the workload associated with the virtual machine. The information may include the services provided by the virtual machines, capacity information of the resources associated with the virtual machine, and other and/or additional information regarding the workload of the virtual machines without departing from the invention. The capacity information may specify the portion of the resources that are used to perform the services provided by the virtual machine. For example, the capacity information may specify that a processor that executes the virtual machine requires 50% of the operation time of the processor, or that the virtual machine data takes up 75% of the storage capacity of a storage device that stores the virtual machine data. The virtual machine workload information (210) may include other and/or additional information associated with the workload associated with the virtual machine without departing from the invention.

Virtual machine entry A (200A) may include other and/or additional information associated with the virtual machine that is associated with virtual machine entry A (200A) without departing from the invention. Virtual machine entry B (200B) and virtual machine entry N (200N) may also include the aforementioned components of virtual machine entry A (200A) without departing from the invention.

Figure 3A:
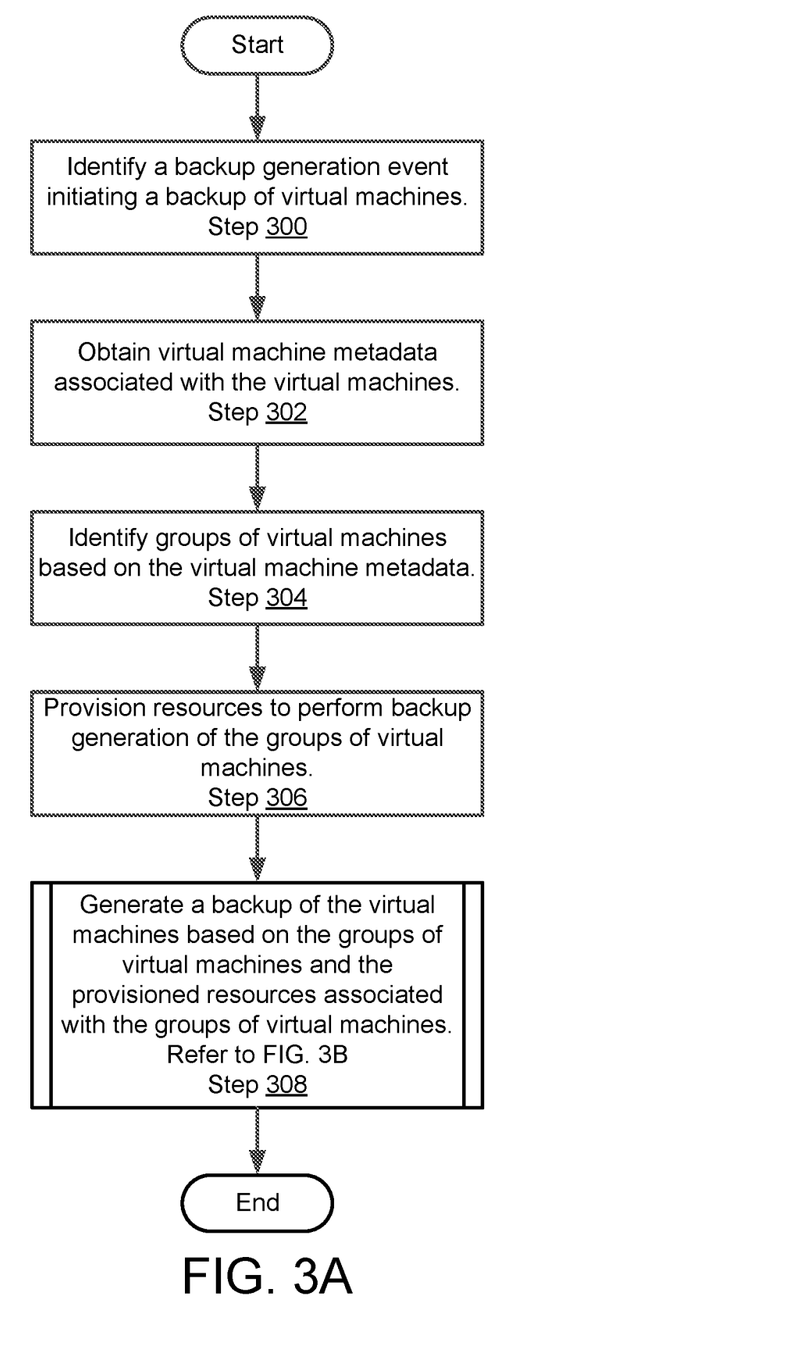
FIG. 3A shows a flowchart of a method of generating backups of virtual machines in accordance with one or more embodiments of the invention.

FIG. 3A shows a flowchart of a method of generating backups of virtual machines in accordance with one or more embodiments of the invention. The method may be performed by, for example, a backup agent (112, FIG. 1B) of a production host (110, FIG. 1A). Other components of the system illustrated in FIG. 1A may perform all, or a portion of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a backup generation event initiating a backup of virtual machines is identified.

In one or more embodiments of the invention, the backup generation event is identified by the backup agent as point in time specified by a backup policy associated with the generation of a backup of the virtual machines or obtaining a message from a client requesting the generation of a backup of the virtual machines. In one embodiment, the backup agent may include a backup policy associated with the virtual machines that specifies points in time to generate backups of the virtual machines. The backup agent may monitor the backup policy and identify when a point in time specified by the backup policy occurs. The backup policy may include the virtual machine identifiers associated with the virtual machines corresponding with the backup policy. The identification of the point in time specified by the backup policy may result in the identification of the backup generation event by the backup agent. In another embodiment of the invention, a user of a client may send a message to the backup agent. The message may include a request to generate a backup of the virtual machines. The message may include virtual machine identifiers associated with the virtual machines. The backup agent may identify obtaining the aforementioned message as the backup generation event. The backup generation event initiating a backup of the virtual machines may be identified via other and/or additional methods without departing from the invention.

In step 302, virtual machine metadata associated with the virtual machines is obtained.

In one or more embodiments of the invention, the backup agent obtains the virtual machine metadata from the virtual machine metadata repository and/or the virtual machines of the production host and/or another entity that monitors the virtual machines. The backup agent may use the virtual machine identifiers specified in the backup policy or message discussed above in step 300 to identify virtual machine entries of the virtual machine metadata repository associated with the virtual machine identifiers. The backup agent may obtain the identified virtual machine entries associated with the virtual machine identifiers. The virtual machine metadata with the virtual machines may be obtained via other and/or additional methods without departing from the invention.

In step 304, groups of virtual machines are identified based on the virtual machine metadata.

In one or more embodiments of the invention, the groups of virtual machines are identified based on the virtual machine metadata by comparing the virtual machine metadata associated with each virtual machine. A group of virtual machines may include one or more virtual machines that are associated with at least a portion of virtual machine metadata that is similar to the at least a portion of the virtual machine metadata associated with the other virtual machines included in the group. The backup agent may compare the virtual machine metadata associated with each virtual machine to identify other virtual machines that are associated with at least a portion of similar virtual machine metadata. Backups of virtual machines associated with similar virtual machine metadata may be generated in similar periods of time. The backup agent may generate a list of group identifiers and associate the virtual machine identifiers of corresponding virtual machines include a group with the group identifier associated with the group. By identifying groups of virtual machines, backups of the groups of virtual machines may be generated independently of one another. As a result, smaller virtual machines or virtual machines associated with small amounts of changed data may not be backed up with larger virtual machines or virtual machines with large amounts of changed data, thereby increasing the efficiency of using production host resources to generate backups of large quantities of virtual machines that are associated with differing virtual machine metadata. Groups of virtual machines may be identified via other and/or additional methods without departing from the invention.

The groups of virtual machines may include virtual machines associated with similar virtual machine sizes, virtual machine change information, virtual machine resources, and/or virtual machine workload information in a group of virtual machines. The backup agent may identify any quantity of groups of virtual machines without departing from the invention. The backup agent may include any quantity of virtual machines in a group of virtual machines without departing from the invention.

As a simple example, the backup generation event may be associated with four virtual machines. The virtual machine metadata associated with the four virtual machines may specify that a first virtual machine includes 500 MB of data, the second virtual machine includes 450 MB of data, and the third and fourth virtual machines each include 50 MB of data. The virtual machine metadata may also indicate that each virtual machine of the virtual machines includes similar virtual machine resources, virtual machine workload information, and have not been previously backed up so do not include change information associated with a previous backup. Based on the virtual machine metadata associated with the virtual machines, the backup agent may identify two groups of virtual machines based on the sizes of the virtual machines. The first group of virtual machines may include the first virtual machine and the second virtual machine. The second group of virtual machines may include the third virtual machine and the fourth virtual machine.

In step 306, resources to perform the backup generation of the groups of virtual machines are provisioned.

In one or more embodiments of the invention, the backup agent uses the virtual machine metadata to provision resources to perform the backup generation of the groups of virtual machines. For a group of virtual machines, the backup agent may use the virtual machine workload information associated with the virtual machines included in the group and/or the virtual machine workload information associated with all other virtual machines hosted by the production host to identify available resources to use during the performance of the backup generation of the group of virtual machines and provision the available resources to be used to perform the backup generation of the virtual machine. The backup agent may provision resources to perform backup generations of the groups of virtual machines to minimize the impact of backup generation on the execution of the workloads on the virtual machines. The backup agent may provision resources to perform backup generation of groups of virtual machines sequentially (i.e., the backup generation of groups of virtual machines is performed one after the other) or in parallel (i.e., the backup generation of the groups of virtual machines are performed simultaneously using the resources of the production host) based on the availability of the resources of the production host. Any combination of the groups of virtual machines may be provisioned to be performed sequentially and/or in parallel without departing from the invention. The backup agent may associated with group identifiers to the resources provisioned to be used during the performance of the backup generation of the group of virtual machines and associate the group identifiers with an order of execution to perform backup generations of groups sequentially and/or in parallel. Resources to perform the backup generation of the groups of virtual machines may be provisioned via other and/or additional methods without departing from the invention.

As a simple example, continuing with the discussion of the example in step 304, based on the virtual machine metadata associated with the two groups of virtual machines and the virtual machine workload information associated with the other virtual machines hosted by the production host, backup agent may identify the availability of the resources of the production host. The availability may indicate that only a single processor of the production host and a single virtual hard disk drive are available to be used during the performance of the backup generation of the two groups of virtual machines, and that the single processor and single virtual hard disk do not include the availability to be used to perform the backup generation the two groups of virtual machines in parallel (i.e., simultaneously). Therefore, the backup agent may provision the processor and the virtual hard disk drive to perform the backup generation of the two groups of virtual machines sequentially, starting with the first group of virtual machines and finishing with the second group of virtual machines.

In step 308, a backup of the virtual machines is generated based on the groups of virtual machines and the provisioned resources associated with the groups of virtual machines. In one or more embodiments of the invention, the backup agent manages the backup generation of the virtual machines based on the groups of virtual machines and the provisioned resources associated with the groups of virtual machines. A backup of the virtual machines may be generated based on the groups of virtual machines and the provisioned resources associated with the groups of virtual machines via other and/or additional methods without departing from the invention. For additional information regarding generating backup of virtual machines based on the groups of virtual machines and the provisioned resources associated with the groups of virtual machines, refer to FIG. 3B.

The method may end following step 308.

Figure 3B:
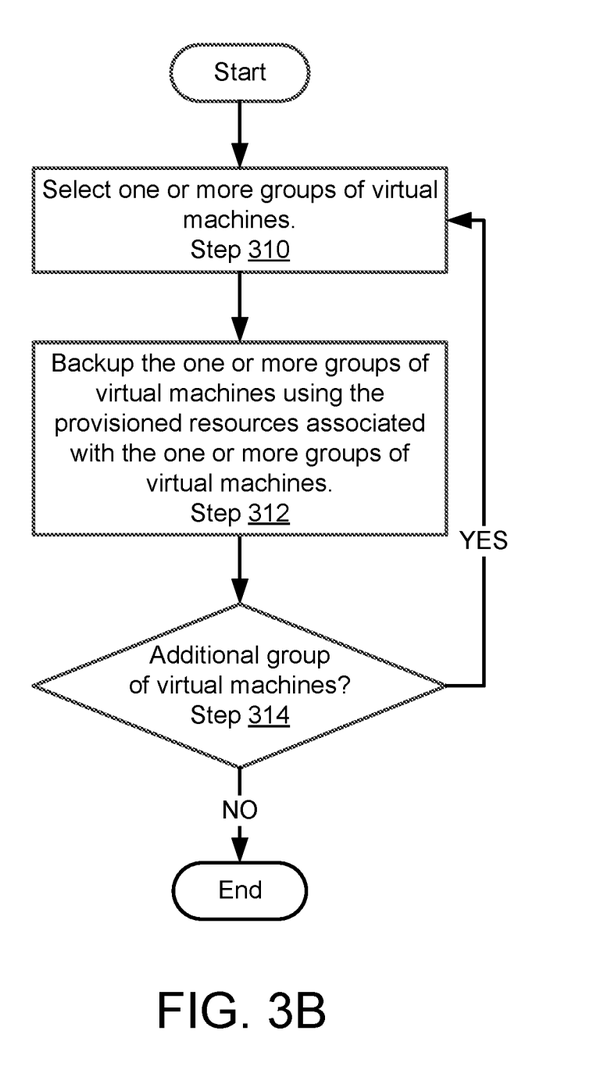
FIG. 3B shows a flowchart of a method of backing up virtual machine groups in accordance with one or more embodiments of the invention.

FIG. 3B shows a flowchart of a method of backing up virtual machine groups in accordance with one or more embodiments of the invention. The method may be performed by, for example, a backup agent (112, FIG. 1B) of a production host (110, FIG. 1A). Other components of the system illustrated in FIG. 1A may perform all, or a portion of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In step 310, one or more groups of virtual machines are selected.

In one or more embodiments of the invention, the backup agent selects a first group of virtual machines of the groups of the virtual machines. The backup agent may select a group identifier associated with a first position of the order of execution for backup generation that has not been previously selected. The backup agent may also identify, based on the provisioning of the resources associated with the groups of virtual machines, one or more additional group identifiers. The additional group identifiers may be associated with one or more groups of virtual machines provisioned to be backed up in parallel with the selected group of virtual machines. The backup agent may also select the groups of virtual machines associated with the additional groups of virtual machines in addition to the first group of virtual machines. One or more groups of virtual machines may be selected via other and/or additional methods without departing from the invention.

In step 312, the group of virtual machines are backed up using the provisioned resources associated with the group of virtual machines.

In one or more embodiments of the invention, the backup agent generates a backup of the one or more groups of virtual machines using the provisioned resources associated with the virtual machines. To generate a backup of a virtual machine of the one or more virtual machine groups, the backup agent may generate a differencing disk associated with the virtual machine to handle and/or track changes to the virtual machine during the generation of the backup and render the parent disk read only. The backup agent may generate and/or initiate (e.g., using the associated provisioned resources) the generation of a snapshot of the virtual machine data included in the virtual machine data repository. After snapshots of all virtual machines are generated for a group of virtual machines, the backup agent may generate backup data and backup metadata using the virtual machine snapshots and virtual machine metadata associated with the group of virtual machines. The backup agent may then provide the backup data and the backup metadata of the group of virtual machines to a backup storage of the backup storages. The backup agent may merge the differencing disks of the virtual machines in a group of virtual machines with associated parent disks after providing the backup data and backup metadata to the backup storage. Each group of virtual machines may be independently backed up as discussed above. A backup of the one or more groups of virtual machines may be generated using the provisioned resources associated with the one or more groups of virtual machines via other and/or additional methods without departing from the invention.

In step 314, a determination is made as to whether there is an additional group of virtual machines.

In one or more embodiments of the invention, the backup agent determines whether there is an additional group of virtual machines using the list of group identifiers associated with the groups of virtual machines. If the backup agent identifies a group identifier associated with a group of virtual machines that has not been previously selected, then the backup agent may determine that there is an additional group of virtual machines. If the backup agent does not identify a group identifier associated with a group of virtual machines that has not been previously selected, then the backup agent may determine that there is not an additional group of virtual machines. The determination as to whether there is an additional group of virtual machines may be determined via other and/or additional methods without departing from the invention.

If it is determined that there is an additional group of virtual machines, then the method may proceed to step 310. If it is determined that there is not an additional group of virtual machines, then the method may end following step 314.

Figure 4:
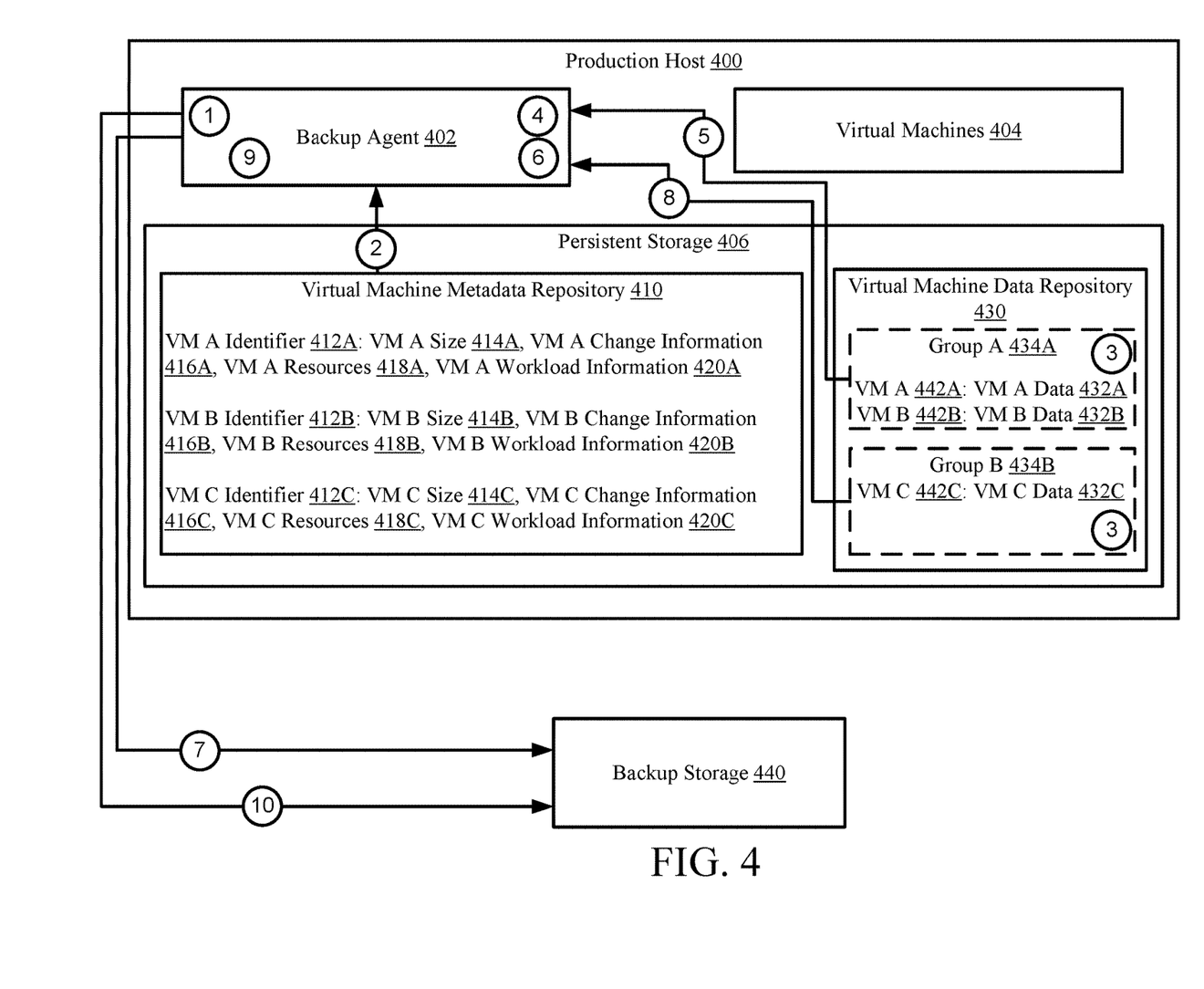
FIG. 4 shows a diagram of the operation of an example system over time in accordance with one or more embodiments of the invention.

To further clarify embodiments of the invention, a non-limiting example is provided in FIG. 4. FIG. 4 shows a diagram of operations performed by an example system over time in accordance with one or more embodiments of the invention. FIG. 4 may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIG. 4.

EXAMPLE

Turing to FIG. 4, consider a scenario in which a backup agent (402) of a production host (400), at step 1, identifies a backup generation event associated with three virtual machines (VMs), VM A (442A), VM B (442B), and VM C (442C) of the virtual machines (404) hosted by the production host (400). In response to the backup generation event, at step 2, the backup agent (402) obtains virtual machine metadata associated with the VMs (442A, 442B, 442C) from the virtual machine metadata repository (410). The virtual machine metadata associated with VM A (442A) includes a VM A identifier (412A), VM A size (414A), VM A change information (416A), VM A resources (418A), and VM A workload information (420A). The virtual machine metadata associated with VM B (442B) includes a VM B identifier (412B), VM B size (414B), VM B change information (416B), VM B resources (418B), and VM B workload information (420B). The virtual machine metadata associated with VM C (442C) includes a VM C identifier (412C), VM C size (414C), VM C change information (416C), VM C resources (418C), and VM C workload information (420C).

At step 3, the backup agent (402) identifies groups of virtual machines using the virtual machine metadata. VM A size (414A) specifies that VM A (442A) is 100 MB, VM B size (414B) specifies that VM B (442B) is 150 MB, and VM C size (414C) specifies that VM C (442C) is 750 MB. VM A change information (416A), VM B change information (416B), and VM C change information (416C) specify that this is the first backup associated with VM A (442A), VM B (442B), and VM C (442C) and there is no information associated with changed virtual machine data. VM A resources (418A), VM B resources (418B), and VM C resources (418C) indicate that the VMs (442A, 442B, 442C) are using the same resources of the production host (400). Finally, VM A workload information (420A), VM B workload information (420B), and VM C workload information (420C) indicate that the VMs ((442A, 442B, 442C) are performing similar workloads. Based on the aforementioned virtual machine metadata (i.e., the size of the VMs (442A, 442B, 442C)), the backup agent (402) identifies two groups of virtual machines, group A (434A) and group B (434B). Group A (434A) includes VM A (442A) and VM B (442B). Group B (434B) includes VM C (442C). At step 4, the backup agent (402) provisions the same resources of the production host (400) to perform the backup generation of both group A (434A) and group B (434B) sequentially, with group A (434A) before group B (434B).

Based on the provisioning of the resources to perform backup generation of the groups (434A, 434B), at step 5, the backup agent (402) obtains VM A data (432A) and VM B data (432B) associated with group A (434A) from the virtual machine data repository (430) of the persistent storage (406). The backup agent (402) then, at step 6, generates a backup of VM A (442A) and VM B (442B) using VM A data (432A) and VM B data (432B) using the provisioned resources associated with group A (434A). At step 7, the backup agent (402) then sends the backup of group A (434A) to the backup storage (440) where the backup is stored. At step 8, the backup agent (402) obtains VM C data (432C)

associated with group B (434B) from the virtual machine data repository (430) of the persistent storage (406). The backup agent (402) then, at step 9, generates a backup of VM C (442C) using VM C data (432C) using the provisioned resources associated with group B (434B). At step 10, the backup agent (402) then sends the backup of group B (434B) to the backup storage (440) where the backup is stored.

END OF EXAMPLE

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating backups of virtual machines by grouping. The virtual machines may be grouped based on virtual machine size, change information associated with the virtual machines, virtual machine resources associated with the virtual machines, and/or workload information associated with the virtual machines. Resources of the production host are provisioned to perform the backup generation of each of the groups of virtual machines to minimize the impact of performing the data protection services on the virtual machine workloads. Further, each virtual machine group is backed up independently using the provisioned resources. As a result, virtual machines with similar backup generation times are backed up together to increase the efficiency of backing up large quantities of virtual machines associated with varying virtual machine metadata, and therefore, require varying backup generation times.

In traditional systems, all virtual machines associated with a backup generation event were backed up at the same time. As a result, virtual machines associated with shorter backup generation times may be required to wait on virtual machines associated with longer backup generation times, thereby resulting in a decrease in performance of the workloads associated with the virtual machines. Embodiments of the invention improve the computational efficiency of backing up large quantities of virtual machines associated with varying virtual machine metadata, and therefore, varying backup generation times by grouping virtual machines associated with similar backup generation times based on virtual machine metadata.

Thus, embodiments of the invention may address the problem of inefficient use of computing resources to protect virtual machines hosted by a production host. This problem arises due to the technological nature of the environment in which the data of the data cluster is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for generating backups of virtual machines, the method comprising:
   in response to identifying a backup generation event associated with virtual machines:
      obtaining, by a backup agent, virtual machine metadata associated with the virtual machines;
      identifying groups of virtual machines, among the virtual machines, based on the virtual machine metadata, wherein the virtual machine metadata comprises:
         virtual machine resources specifying at least one processor, at least one storage, and at least one hypervisor associated with the virtual machines, and
         virtual machine workload information specifying capacities of the virtual machine resources associated with the virtual machines;
      provisioning resources to generate backups of the virtual machines based on the groups of virtual machines, wherein provisioning the resources comprises selecting the resources based on the virtual machine workload information of the virtual machine metadata; and generating a backup of the virtual machines based on the groups of virtual machines using the provisioned resources associated with the groups of virtual machines.

2. The method of claim 1, wherein generating the backup of the virtual machines based on the groups and the provisioned resources associated with the groups comprises:
- selecting a first group of virtual machines of the groups of virtual machines;
- generating a first backup of the first group of virtual machines using first provisioned resources of the provisioned resources associated with the first group of virtual machines;
- selecting a second group of virtual machines of the groups of virtual machines; and
- generating a second backup of the second group of virtual machines using second provisioned resources of the provisioned resources associated with the second group of virtual machines.

3. The method of claim 2, wherein the first backup and the second backup are generated sequentially.

4. The method of claim 2, wherein the first backup and the second backup are generated in parallel.

5. The method of claim 1, wherein the virtual machine metadata further comprises at least one of:
- virtual machine identifiers,
- virtual machine sizes, and
- virtual machine change information.

6. The method of claim 1, wherein a group of virtual machines of the groups of virtual machines comprises a portion of the virtual machines associated with similar virtual machine metadata.

7. The method of claim 6, wherein identifying the group of virtual machines comprises:
- comparing virtual machine metadata associated with the virtual machines; and
- identifying the portion of virtual machines based on the comparison.

8. A system for generating backups of virtual machines, the system comprising:
- persistent storage for storing a virtual machine metadata repository; and
- a backup agent, wherein the backup agent is configured to:
  - in response to identifying a backup generation event associated with virtual machines:
    - obtain, by a backup agent, virtual machine metadata associated with the virtual machines;
    - identify groups of virtual machines, among the virtual machines, based on the virtual machine metadata, wherein the virtual machine metadata comprises:
      - virtual machine resources specifying at least one processor, at least one storage, and at least one hypervisor associated with the virtual machines, and
      - virtual machine workload information specifying capacities of the virtual machine resources associated with the virtual machines;
    - provision resources to generate backups of the virtual machines based on the groups of virtual machines, wherein provisioning the resources comprises selecting the resources based on the virtual machine workload information of the virtual machine metadata; and
    - generate a backup of the virtual machines based on the groups of virtual machines using the provisioned resources associated with the groups of virtual machines.

9. The system of claim 8, wherein generating the backup of the virtual machines based on the groups and the provisioned resources associated with the groups comprises:
- selecting a first group of virtual machines of the groups of virtual machines;
- generating a first backup of the first group of virtual machines using first provisioned resources of the provisioned resources associated with the first group of virtual machines;
- selecting a second group of virtual machines of the groups of virtual machines; and
- generating a second backup of the second group of virtual machines using second provisioned resources of the provisioned resources associated with the second group of virtual machines.

10. The system of claim 9, wherein the first backup and the second backup are generated sequentially.

11. The system of claim 9, wherein the first backup and the second backup are generated in parallel.

12. The system of claim 8, wherein the virtual machine metadata further comprises at least one of:
- virtual machine identifiers,
- virtual machine sizes, and
- virtual machine change information.

13. The system of claim 8, wherein a group of virtual machines of the groups of virtual machines comprises a portion of the virtual machines associated with similar virtual machine metadata.

14. The system of claim 13, wherein identifying the group of virtual machines comprises:
- comparing virtual machine metadata associated with the virtual machines; and
- identifying the portion of virtual machines based on the comparison.

15. A non-transitory computer readable medium comprising computer readable program code, which when executed by a computer processor enables the computer processor to perform a method for generating backups of virtual machines, the method comprises:
- in response to identifying a backup generation event associated with virtual machines:
  - obtaining, by a backup agent, virtual machine metadata associated with the virtual machines;
  - identifying groups of virtual machines, among the virtual machines, based on the virtual machine metadata, wherein the virtual machine metadata comprises:
    - virtual machine resources specifying at least one processor, at least one storage, and at least one hypervisor associated with the virtual machines, and
    - virtual machine workload information specifying capacities of the virtual machine resources associated with the virtual machines;
  - provisioning resources to generate backups of the virtual machines based on the groups of virtual machines, wherein provisioning the resources comprises selecting the resources based on the virtual machine workload information of the virtual machine metadata; and generating a backup of the virtual machines based on the groups of virtual machines using the provisioned resources associated with the groups of virtual machines.

16. The non-transitory computer readable medium of claim 15, wherein generating the backup of the virtual machines based on the groups and the provisioned resources associated with the groups comprises:
- selecting a first group of virtual machines of the groups of virtual machines;
- generating a first backup of the first group of virtual machines using first provisioned resources of the provisioned resources associated with the first group of virtual machines;
- selecting a second group of virtual machines of the groups of virtual machines; and
- generating a second backup of the second group of virtual machines using second provisioned resources of the provisioned resources associated with the second group of virtual machines.

17. The non-transitory computer readable medium of claim 16, wherein the first backup and the second backup are generated sequentially.

18. The non-transitory computer readable medium of claim 16, wherein the first backup and the second backup are generated in parallel.

19. The non-transitory computer readable medium of claim 15, wherein the virtual machine metadata further comprises at least one of:
- virtual machine identifiers,
- virtual machine sizes,
- virtual machine resources, and
- virtual machine change information.

20. The non-transitory computer readable medium of claim 15, wherein a group of virtual machines of the groups of virtual machines comprises a portion of the virtual machines associated with similar virtual machine metadata.

* * * * *